Figure 3:
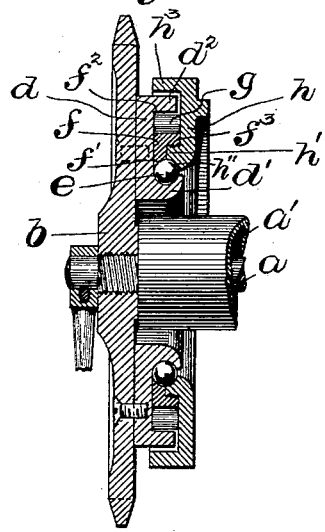
Figure 4:
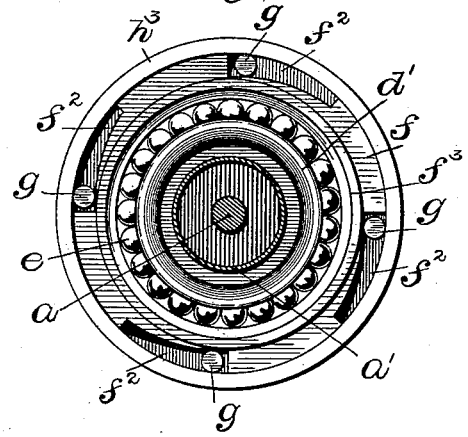
Figure 5:
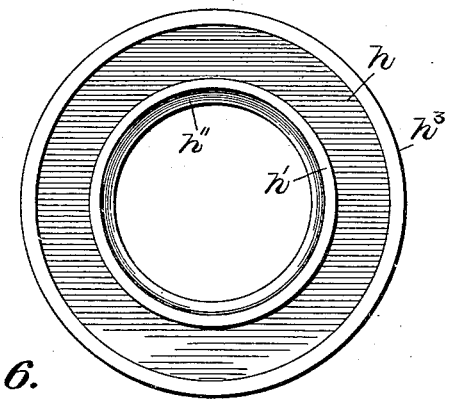
Figure 6:
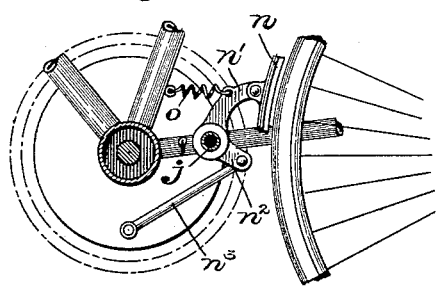
Figure 7:
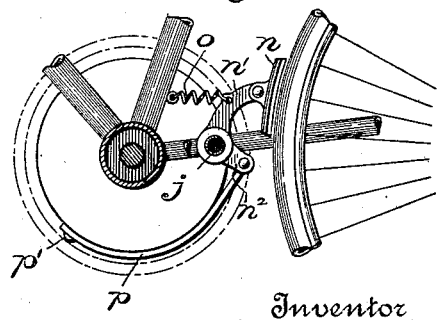

No. 625,560. Patented May 23, 1899.
H. B. KEIPER.
BACK PEDALING BRAKE.
(Application filed Jan. 27, 1899.)
(No Model.) 2 Sheets—Sheet 1.
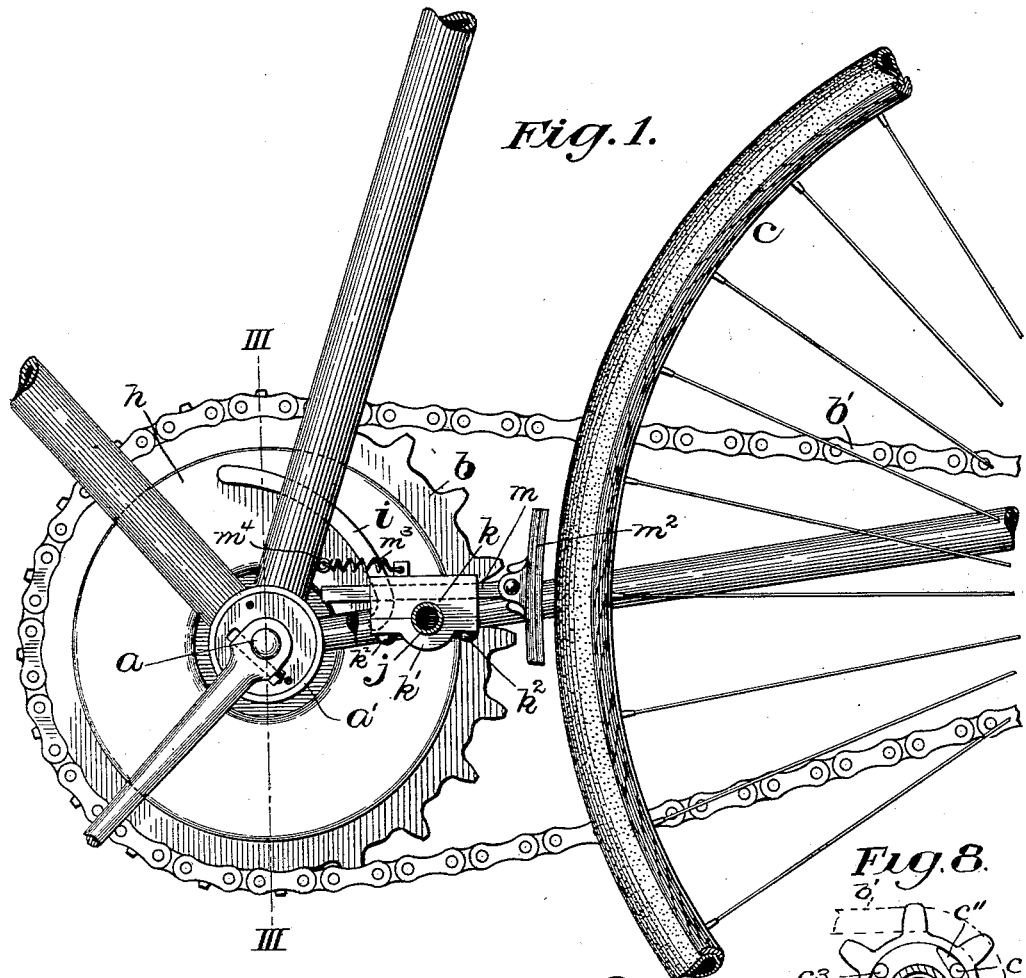
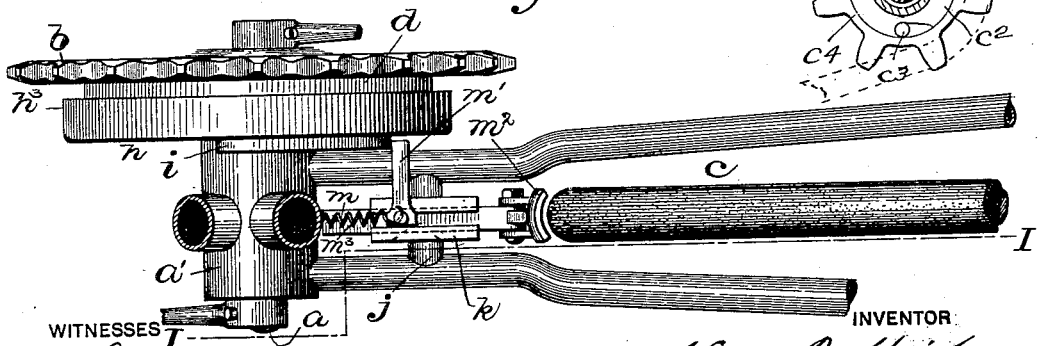

No. 625,560. Patented May 23, 1899.
H. B. KEIPER.
BACK PEDALING BRAKE.
(Application filed Jan. 27, 1899.)
(No Model.) 2 Sheets—Sheet 2.

Witnesses
C. W. Smith
Osgood H. Dowell

Inventor
Henry B. Keiper
By Julian C. Dowell
His Attorney

THE NORRIS PETERS CO., PHOTO-LITHO., WASHINGTON, D. C.

UNITED STATES PATENT OFFICE.

HENRY B. KEIPER, OF LANCASTER, PENNSYLVANIA, ASSIGNOR TO JAMES C. REBER, OF READING, PENNSYLVANIA.

BACK-PEDALING BRAKE.

SPECIFICATION forming part of Letters Patent No. 625,560, dated May 23, 1899.

Application filed January 27, 1899. Serial No. 703,537. (No model.)

*To all whom it may concern:*

Be it known that I, HENRY B. KEIPER, a citizen of the United States, residing at Lancaster, in the county of Lancaster and State of Pennsylvania, have invented certain new and useful Improvements in Back-Pedaling Brake Mechanisms for Bicycles; and I do hereby declare the following to be a full, clear, and exact description of the invention, such as will enable others skilled in the art to which it appertains to make and use the same.

This invention relates to back-pedaling brake mechanisms for bicycles; and the principal object is to provide a form of braking attachment applicable to any ordinary construction of machine and not requiring any widening thereof at the crank-hanger or any difference in the usual arrangement of bearings for the crank-shaft.

To this end the invention consists in certain novel features of construction and combinations of parts, the essential elements of which are recited in the appended claims and a number of forms of embodiment of which are illustrated in the accompanying drawings and specifically described hereinafter.

Of said drawings, which form part of this specification, Figure I represents, partly in side elevation and partly in section, a sufficient portion of a bicycle of the well-known safety type to show how the invention is applied thereto. Fig. II shows a sectionalized top plan view of the same. Fig. III is a cross-section on the line III III of Fig. I. Fig. IV shows certain members of the braking attachment in side elevation with the crank hanger and shaft in cross-section. Fig. V shows another member of the braking mechanism in side elevation. Figs. VI and VII are views similar to Fig. I, illustrating modified constructions. Fig. VIII illustrates a form of driving connection which may be employed at the rear wheel.

In the drawings the reference-letter $a$ designates the crank or driving shaft, which is journaled in the crank-hanger $a'$ in the ordinary way and carries affixed to it a sprocket-wheel $b$, from which a chain $b'$ transmits motion to the sprocket-wheel on the rear ground-wheel $c$.

Referring to Fig. VIII, the hub of the wheel $c$ is designated by the letter $c'$ and carries a flange or collar $c^2$, having tapering pockets or recesses $c''$, which accommodate wedging rollers $c^3$, the sprocket-wheel $c^4$ being journaled upon said collar and driving the same only in forward rotation.

In carrying out my invention an annular disk $d$ is fastened by screws or otherwise to the sprocket-wheel, on the inner side of the same, and encircles the crank-hanger, said disk having an inner laterally-projecting flange $d'$, dished in its outer side to provide a raceway for a set of antifriction-balls $e$, and also an outer laterally-projecting flange $d^2$, the inner face of which constitutes a friction-surface, as will hereinafter appear. The annular recess formed between the flanges $d'$ and $d^2$ is occupied by a ring $f$, having a beveled and concaved inner edge or face $f'$ to engage the antifriction-balls $e$ and formed with a number of elongated tapering recesses $f^2$ in its outer edge, so formed that their bases confront the inner surface of the flange $d^2$. These recesses all taper in depth in the same direction and each is designed to contain a roller $g$, which while in the deepest end of the recess permits free relative movement between the disk $d$ and the ring $f$, but when moved toward the shallower end of the recess constitutes a wedging connection between said parts, so as to cause the one to rotate the other. The ring $f$ is formed with an internal screw-threaded annular shoulder $f^3$, and an annular disk $h$ is secured to said ring $f$ by means of a laterally-projecting annular flange $h'$, with exterior screw-threads which engage those of the shoulder $f^3$, this flange $h'$ being formed with a beveled and concaved inner edge or face $h''$ to engage the antifriction-balls $e$. Said disk $h$ is also formed with a flange $h^3$, which overlaps the flange $d^2$ for the purpose of excluding foreign matter from the recesses $f^2$.

It will be seen that with the above-described construction forward rotation of the sprocket-wheel in propulsion of the bicycle has no effect upon the ring $f$ and disk $h$, the rollers $g$ being kept in the deeper portions of the recesses $f^2$ and the antifriction-balls $e$ allowing the sprocket-wheel and disk $d$ to run freely independently of the said ring and disk. When, however, the sprocket-wheel is turned backward, the inner friction-surface of the flange $d^2$ acting upon the rollers $g$ drives the same toward the shallower ends of the recesses $f^2$ and said rollers become wedged between said flange $d^2$ and the bottoms of the recesses $f^2$, whereupon the disk $f$ will be turned rearwardly with the sprocket-wheel, and of course the disk $h$ will also move in the same direction. Therefore in order to secure a braking effect it is only necessary to provide suitable connections between this disk $h$ and the brake-shoe, whereby the latter will be applied upon rearward turning of said disk $h$. This may be accomplished in a number of ways, some of which are illustrated in the drawings.

In the form shown in Figs. I, II, and III said disk is shown as formed on the inner side with a cam-strip or flange $i$, having a slight curvature from end to end and a general obliquity or tangential relation to the disk. A clamp is applied to a convenient portion of the frame of the machine, in the present instance a short cross-bar $j$ extending between the members of the horizontal rear fork of the frame, said clamp comprising members $k$ and $k'$, fitting above and below said cross-bar and secured together by screws $k^2$. The upper member $k$ is formed with a horizontal slide-way through which passes a bar $m$, having a laterally-projecting arm $m'$, which extends over the outer surface of the cam-strip or flange $i$ on the disk $h$. A brake-shoe $m^2$ is suitably mounted on the rear end of the bar $m$, and a retractile spring $m^3$ connects the said bar with a convenient portion of the frame, as shown at $m^4$, said spring exerting itself to retract the brake-shoe and hold it away from the tread of the ground-wheel $c$. Normally the end portion of the cam-strip or flange nearest the center of rotation stands in front of the projection $m'$, so that when the disk is turned rearwardly this cam-strip, moving along the said projection, will slide the bar $m$ rearwardly and press the brake-shoe against the tread of the rear wheel of the bicycle in an obvious manner. Of course when the sprocket-wheel is again propelled forward the disk $h$ will be advanced until the rollers $g$ reach the deep ends of the recesses $f^2$, which will restore the parts to their normal relation, ready to again operate to apply the brakes upon rearward turning of the sprocket-wheel. The end portion of the cam-strip $i$ nearest the center of rotation is preferably carried inwardly on a more pronounced curve than that followed by the greater portion of said strip, so that in the event of said cam-strip being moved beyond the projection $m'$ there will be no possibility of its passing to the rear of the same when the disk is turned backward.

In Fig. VI a brake-shoe $n$ is shown as pivotally mounted upon one arm, $n'$, of a bell-crank lever pivotally mounted upon the cross-bar $j$ of the frame, the other arm, $n^2$, of said lever being connected by a link $n^3$ with the disk $h$. Said link, being pivotally connected with the latter and the arm $n^2$ of the bell-crank lever, constitutes, in effect, a pitman, through which upon rearward turning of the disk $h$ an application of the brake-shoe to the wheel is effected in an obvious manner. A spiral spring $o$ connects the arm $n'$ of the bell-crank lever with a convenient portion of the frame, so as to release the brake upon forward turning of the sprocket-wheel.

The construction shown in Fig. VII differs from that shown in Fig. VI in the employment of a flexible strap or band $p$ in place of the link or pitman $n^3$, said strap or band being connected at one end with the short arm $n^2$ of the bell-crank lever and being fastened at the opposite end to the periphery of the disk $h$, as shown at $p'$. The spiral spring $o$ is employed, as before, and the operation will be apparent.

It will be seen that any one of the constructions above described is well calculated to thoroughly fulfil the object primarily stated; but of course it will be understood that the invention can be embodied in other forms and is not limited to the details of construction here shown.

Having thus fully described my invention, what I claim as new, and desire to secure by Letters Patent of the United States, is—

1. In a bicycle, the combination with one-way driving connections between the sprocket-wheel and rear ground-wheel, of a back-pedaling brake mechanism comprising an annular disk fastened to the sprocket-wheel and having a laterally-projecting outer flange and a similarly-projecting ball-race, balls occupying the same, a ring formed to engage said balls and provided with tapering recesses or pockets confronting the flange of the disk, rollers in said pockets, an annular disk detachably secured to the ring and formed to engage the balls, a brake-shoe, and suitable connections between the latter and the last-named annular disk, substantially as described.

2. In back-pedaling brake mechanism for bicycles, the combination with the driving-shaft and one-way driving connections between the same and the rear ground-wheel, of a laterally-projecting annulus fixedly associated with said driving-shaft, an annular brake member with a peripheral surface confronting the inner surface of said annulus and with a flange taking over the outer surface of the latter, one or more tapering pockets being provided in one annular surface of the inner confronting pair; together with wedging rollers in said pockets; a brake-shoe, and suitable connections between the latter and the said annular brake member, substantially as described.

3. In back-pedaling brake mechanism for bicycles, the combination with the driving-shaft and one-way driving connections between the same and the rear ground-wheel, of a laterally-projecting annulus fixedly associated with said driving-shaft, an annular brake member with a peripheral surface confronting the inner surface of said annulus, and an exterior cam-strip on one side, one or more tapering pockets or recesses being provided in one of the said confronting annular surfaces; together with wedging rollers in said recesses, a slideway longitudinally disposed on the frame of the machine, a slide-bar engaging said slideway and having a lateral projection extending in rear of the cam-strip on the annular brake member, a brake-shoe carried by said slide-bar, and a spring for retracting the latter.

In testimony whereof I affix my signature in presence of two witnesses.

HENRY B. KEIPER.

Witnesses:
M. G. SWAN,
WALTER A. MILLER.